(12) United States Patent
Yamazaki et al.

(10) Patent No.: US 7,488,147 B2
(45) Date of Patent: Feb. 10, 2009

(54) SPINDLE DEVICE

(75) Inventors: Kazuo Yamazaki, El Macero, CA (US); Makoto Fujishima, Yamatokoriyama (JP); Yoichi Okamoto, Yamatokoriyama (JP)

(73) Assignees: Mori Seiki Co., Ltd., Nara (JP); Intelligent Manufacturing Systems International, San Francisco, CA (US)

( * ) Notice: Subject to any disclaimer, the term of this patent is extended or adjusted under 35 U.S.C. 154(b) by 0 days.

(21) Appl. No.: 11/962,768

(22) Filed: Dec. 21, 2007

(65) Prior Publication Data

US 2008/0152451 A1  Jun. 26, 2008

(30) Foreign Application Priority Data

Dec. 22, 2006  (JP) ............................. 2006-346017

(51) Int. Cl.
- *B23C 1/00* (2006.01)
- *H02K 7/108* (2006.01)
- *H02K 7/11* (2006.01)

(52) U.S. Cl. ........................ 409/231; 310/78; 192/84.91

(58) Field of Classification Search ......... 409/231–233; 408/239 R, 239 A, 132, 124; 81/467, 469, 81/473, 475–476; 310/76, 78, 92, 100, 101, 310/102 A, 112, 114; 192/84.91, 84.92, 192/84.96; 173/178, 217, 213

See application file for complete search history.

(56) References Cited

U.S. PATENT DOCUMENTS 2,343,875 A * 3/1944 Schwartz .................... 409/231
3,037,601 A * 6/1962 Binder ..................... 192/84.91
3,419,087 A * 12/1968 Amstberg et al. ........... 173/178
4,167,218 A * 9/1979 Horiuchi et al. ......... 408/239 R
4,748,357 A * 5/1988 Kempken ................... 409/233
5,100,271 A * 3/1992 Kameyama et al. ......... 409/231
5,753,988 A * 5/1998 Cipriani ...................... 310/114
6,204,585 B1 * 3/2001 Riello et al. ................ 409/231
2002/0158541 A1 * 10/2002 Schuettel et al. ............ 310/217

FOREIGN PATENT DOCUMENTS

JP  04-275803 A * 10/1992
JP  6-30325 Y2   8/1994

* cited by examiner

*Primary Examiner*—Erica E Cadugan
(74) *Attorney, Agent, or Firm*—Westerman, Hattori, Daniels & Adrian, LLP.

(57) ABSTRACT

The spindle device 1 is provided with: a housing 10 formed with a support hole 10a; a spindle 12 which is supported to rotate freely about an axis within the support hole 10a of the housing 10 and of which distal end is attached with a tool T; a drive motor 20 for rotating the spindle 12 about the axis, the drive motor 20 being configured by a rotor 22 arranged to rotate freely on an outer circumferential surface of the spindle 12 and a stator 23 fixedly provided on an inner circumferential surface of the support hole 10a of the housing 10; an electromagnetic clutch 30 for transmitting intermittently a drive force of the drive motor 20 to the spindle 12; and a controlling device 40 for controlling an operation of the drive motor 20 and that of the electromagnetic clutch 30.

9 Claims, 8 Drawing Sheets

SPINDLE DEVICE

BACKGROUND OF THE INVENTION

1. Technical Field

The present invention relates to a spindle device which is provided with a spindle arranged to rotate freely about an axis, and attached with a tool and drive motors for rotating the spindle about the axis.

2. Description of the Related Art

Conventionally, as a spindle device, a spindle device disclosed in Japanese Examined Utility Model Application Publication No. 6-30325 is known, for example. The spindle device is configured by: a spindle which is arranged to rotate freely about an axis and of which distal end is attached with a tool; a support member which supports the spindle to rotate freely about the axis; a drive motor for rotating the spindle about the axis, the drive motor being configured by a rotor arranged to rotate freely on an outer circumferential surface on a rear end side of the spindle and a stator fixedly provided in the support member; a speed change mechanism for transmitting a rotational force of the drive motor directly or via a reduction gear to the spindle; and other components.

The speed change mechanism is formed of: an annular drive gear fixedly provided on an end surface at a distal end side of the spindle of the rotor; an annular clutch member which is provided on an outer circumferential surface of the spindle to face the drive gear and which is capable of moving freely in a spindle axial direction and rotating freely, together with the spindle; a speed change shaft which is disposed parallel to the spindle and which is arranged to move freely in an axial direction; a coupling member which couples the clutch member and the speed change shaft and which is connected to the clutch member and the speed change shaft such that the both components rotate freely about the axis; a drive cylinder for moving the speed change shaft in an axial direction; a first reduction gear and a second reduction gear which are fixedly provided to be kept apart by an interval in an axial direction of the speed change shaft; and a driven gear fixedly provided on the outer circumferential surface of the spindle to sandwich, together with the drive gear, the clutch member.

The drive gear is formed with teeth on both outer and inner circumferential surfaces. The clutch member is formed, on the outer circumferential surface on a side of the drive gear, with teeth which can be meshed with those formed on the inner circumferential surface of the drive gear. The first reduction gear is formed to be larger in diameter than the second reduction gear, and configured to be meshed with the teeth formed on the outer circumferential surface of the drive gear. The second reduction gear is configured to be meshed with the driven gear.

In the speed change mechanism, when the speed change shaft is moved in the axial direction by the drive cylinder, the speed change shaft, the clutch member, the coupling member, and the first and second reduction gears are integrally moved to a rear end side of the spindle. As a result, teeth of the clutch member and those on the inner circumferential surface of the drive gear are meshed, thereby resulting in a state where the teeth on the outer circumferential surface of the drive gear and the first reduction gear are not meshed and the second reduction gear and the driven gear are not meshed. Therefore, when the drive motor is then driven, a rotational force of the rotor is transmitted via the drive gear and the clutch member to the spindle, thereby rotating the spindle at high speed.

On the other hand, when the speed change shaft is moved in the axial direction by the drive cylinder, the speed change shaft, the clutch member, the coupling member, and the first and second reduction gears are integrally moved to a distal end side of the spindle. As a result, the teeth on the outer circumferential surface of the drive gear and the first reduction gear are meshed, and the second reduction gear and the driven gear are meshed, resulting in a state where the teeth of the clutch member and those on the inner circumferential surface of the drive gear are not meshed. Therefore, when the drive motor is then driven, the rotational force of the rotor is transmitted via the drive gear, the first reduction gear, the speed change shaft, the second reduction gear, and the driven gear to the spindle, thereby rotating the spindle at low speed.

In this way, according to the spindle device, since the speed change mechanism permits the spindle to rotate in a manner to switch between at high speed and at low speed, it is possible to correspond to both high speed and light duty cutting and low speed and heavy duty cutting.

However, in the conventional spindle device, the rotor of the drive motor and the spindle are in a state of being constantly coupled via the drive gear and the clutch member, or the drive gear, the first reduction gear, the speed change shaft, the second reduction gear, and the driven gear. Further, a drive force (rotational force of the rotor) of the drive motor is constantly transmitted to the spindle. Therefore, when a tool and a workpiece are interfered, for example, its shock is large and a serious accident may arise. Further, when the tool and the workpiece are interfered, or when lest perhaps the rotation of the spindle is stopped, an excessive load is applied to the drive motor, and as a result, the drive motor may be damaged.

Torque corresponding to the drive force of the drive motor is applied to the spindle, and thus, torque applied to the spindle becomes large. In this case, a force applied to a bearing for supporting the spindle to rotate freely becomes also large. When the force applied to the bearing is large, an operating life of the bearing is shortened and so on, which is a problem.

Further, the conventional spindle device is designed such that by moving the speed change shaft in the axial direction by the drive cylinder, the speed change shaft, the clutch member, the coupling member, and the first and second reduction gears are integrally moved in the axial direction of the spindle, thereby switching the spindle rotation between at high speed and at low speed. This results in another problem in that a structure becomes complicated and a device configuration becomes large.

Still further, a time required for increasing the rotational speed of the spindle to a previously set rotational speed or a time for stopping the rotation of the spindle depend on a performance or the like of the drive motor. If this time can be shortened, it is preferable.

In a spindle device configured such that a tool is attached directly or appropriately via a tool attaching member or the like to the spindle by means of a screw connection, if the tool or the tool attaching member is tightened to the spindle, it is difficult to loosen the tool or the tool attaching member when the tool is detached from the spindle, which results in a problem that detaching the tool is not easy.

The present invention has been achieved in view of the above-described circumstances, and an object thereof is to provide a spindle device configured to alleviate a shock caused as a result of a collision between a tool and a workpiece, to prevent an excessive load from being applied to a drive motor, to limit a maximum value of torque applied to the spindle to a certain value or less, and to be simple and compact. The object also is to provide a spindle device capable of shortening a time required for increasing a rotational speed of the spindle to a previously set rotational speed or stopping the rotation of the spindle, and capable of easily performing attaching and detaching the tool.

BRIEF SUMMARY OF THE INVENTION

To achieve the above-described object, the present invention relates to:

a spindle device comprising: a housing formed with a support hole; a spindle which is supported to rotate freely about an axis within the support hole of the housing and to which a tool is attached; a first drive motor for rotating the spindle about the axis; and controlling means for controlling an operation of the first drive motor, wherein the first drive motor is configured by a first rotor arranged to rotate freely on an outer circumferential surface of the spindle and a first stator fixedly provided on an inner circumferential surface of the support hole of the housing in a manner to be kept apart by an interval toward a radially outward direction from an outer circumferential surface of the first rotor, the spindle device comprising coupling means configured to perform a coupling operation for coupling the spindle and the first rotor and an uncoupling operation for uncoupling between the spindle and the first rotor, wherein the controlling means is configured to control the operation of the coupling means.

According to the present invention, when the first drive motor is driven by the controlling means, the first rotor is rotated. A rotational force of the first rotor is transmitted via the coupling means to the spindle when the spindle and the first rotor are coupled by the coupling operation of the coupling means, and the rotational force of the first rotor is not transmitted to the spindle when the spindle and the first rotor are uncoupled by the uncoupling operation of the coupling means.

Thus, operation control of the first drive motor, control of the coupling operation and that of the uncoupling operation of the coupling means are individually performed. As a result, the operation of the first drive motor is controlled in a state where the coupling means is caused to perform the coupling operation, thereby controlling the rotation of the spindle; the operation of the first drive motor is controlled in a state where the coupling means is caused to perform the uncoupling operation, thereby controlling the rotation of the first rotor only; the coupling operation of the coupling means is controlled in a state where the coupling means is caused to perform the uncoupling operation and in a state where the first drive motor is driven to rotate the first rotor, thereby controlling the rotation of the spindle; the uncoupling operation of the coupling means is controlled in a state where the coupling means is caused to perform the coupling operation and in a state where the first drive motor is driven to rotate the spindle, thereby controlling the rotation of the spindle, for example.

Thus, in the spindle device according to the present invention, it is possible to control the rotation of the spindle by not only the control of the first drive motor by the controlling means but also by control of the coupling means. The coupling means is configured to execute the coupling operation and the uncoupling operation based on a command signal, obtained from the controlling means, relating to the coupling operation and the uncoupling operation, for example.

Such a spindle device can be provided with a configuration described below, for example, and with such a configuration, the following effects can be obtained:

That is, the controlling means may be configured to supply a current to the first rotor or the first stator to rotate the first rotor in a state where the coupling means is caused to perform the coupling operation, and to cause the coupling means to perform the uncoupling operation when the current supplied to the first rotor or the first stator becomes larger than a previously set value.

In this way, while the spindle is rotated by the first drive motor to machine a workpiece, if a load of the first drive motor becomes large due to a collision between a tool and the workpiece, and so on, for example, the current supplied to the first rotor or the first stator becomes larger than the previously set value. It is therefore determined by the controlling means that the tool is collided with the workpiece, and thus, under the control of the controlling means, the uncoupling operation is performed by the coupling means. Thereby, the rotational force of the first rotor is not transmitted to the spindle immediately after the collision, and thus, it becomes possible to alleviate a shock resulting from the collision, thereby preventing a serious accident. Further, it is also possible to prevent an excessive load from being applied to the first drive motor, and thus, the first drive motor is damaged.

The coupling means may be configured by a friction clutch, and may be configured to comprise: a first member and a second member configured to be in contact with each other, the first member being connected to the first rotor, and the second member being connected to the outer circumferential surface of the spindle; and a contact mechanism for bringing the first member and the second member into contact by a previously set force at the time of the coupling operation and for canceling the contact force acted between the first member and the second member at the time of the uncoupling operation.

In this way, while the spindle is rotated by the first drive motor, the spindle is applied torque that corresponds to the rotational force of the first rotor. When torque applied to the spindle becomes large, and as a result, if torque exceeds that which is transmittable by the friction force acted between the first member and the second member, skidding is generated between the first member and the second member, and thus, it becomes possible to limit a maximum value of torque applied to the spindle to a certain value or less. Further, when the maximum value of torque applied to the spindle is limited to a certain value or less, a force applied to a bearing which supports the spindle to rotate freely can also be limited to a certain value or less. As a result, it is possible to effectively prevent a problem such as the operating life of the bearing is shortened, and so on.

In this case, the contact mechanism of the friction clutch may be configured to render variable the force for bringing the first member and the second member into contact, and the controlling means may be configured to control the contact mechanism of the friction clutch to change a contact force between the first member and the second member.

In this way, when the controlling means controls the contact mechanism of the friction clutch to change the contact force between the first member and the second member, the friction force acted between the first member and the second member is rendered large when the contact force is rendered large, thereby rendering large the maximum value of torque transmittable by the friction clutch. The friction force acted between the first member and the second member is rendered small when the contact force is rendered small, thereby rendering small the maximum value of torque transmittable by the friction clutch. In this way, when the maximum value of transmittable torque is adjusted, the maximum value of torque applied to the spindle and that of the force applied to the bearing can be easily adjusted.

The spindle may be configured such that the tool is attached by means of a screw connection, and the controlling means may be configured such that in a state where the coupling means is caused to perform the uncoupling operation, the first drive motor is driven, and thereafter, the coupling means is caused to perform the coupling operation.

In this way, the controlling means drives the first drive motor to rotate the first rotor only, and thereafter, causes the coupling means to perform the coupling operation to couple the first rotor and the spindle. As a result, the non-rotating spindle can be abruptly rotated and an impulsive force resulting from the abrupt rotation can be applied to the non-rotating spindle. Thereby, even when the tool is tightened to the spindle, the tool can be easily loosened, and in addition, the tool can be easily attached to the spindle. Thus, attaching and detaching the tool can be easily performed.

The spindle device may further comprise a second drive motor for rotating the spindle about the axis, wherein the second drive motor is configured by a second rotor arranged on the outer circumferential surface of the spindle in a manner to be kept apart by an interval in an axis direction of the spindle from a disposing position of the first rotor, and being smaller in mass than the first rotor and a second stator fixedly provided on the inner circumferential surface of the support hole of the housing in a manner to be kept apart by an interval in a radially outward direction from an outer circumferential surface of the second rotor, and the controlling means may further be configured to control an operation of the second drive motor.

In this way, operation control of the first drive motor, control of the coupling operation and that of uncoupling operation of the coupling means, and operation control of the second drive motor are individually performed. As a result, an operation of the first drive motor or the first drive motor and the second drive motor is controlled in a state where the coupling means is caused to perform the coupling operation, thereby controlling the rotation of the spindle; an operation of the second drive motor only is controlled in a state where the coupling means is caused to perform the uncoupling operation, thereby controlling the rotation of the spindle; an uncoupling operation of the coupling means is controlled in a state where the coupling means is caused to perform the coupling operation and in a state where the first drive motor or the first drive motor and the second drive motor are driven to rotate the spindle, thereby controlling the operation (rotation of the spindle) of the second drive motor and the operation of the first drive motor, respectively, after the uncoupling operation is executed; and the coupling operation of the coupling means is controlled in a state where the coupling means is caused to perform the uncoupling operation and in a state where the first drive motor is driven to rotate the first rotor, and in addition the second drive motor is driven to rotate the spindle, thereby controlling the rotation of the spindle by the first drive motor or the first drive motor and the second drive motor after the coupling operation is executed, for example.

Further, the coupling means switches between a state where the rotational force is applied to the spindle by the first drive motor or the first drive motor and the second drive motor and that where the rotational force is applied to the spindle by the second drive motor. Thereby, such a switch can be realized by a simple and compact structure.

The controlling means may be configured to rotate the spindle about the axis by switching between when at least the first drive motor is driven in a state where the coupling means is caused to perform the coupling operation and when the second drive motor only is driven in a state where the coupling means is caused to perform the uncoupling operation.

In this way, when at least the first drive motor is driven in a state where the coupling means is caused to perform the coupling operation, since the first rotor of the first drive motor is larger in mass than the second rotor of the second drive motor, the rotational speed of the spindle is stabled and so on in spite of a variation in load or a shock resulting from an interrupted cutting in machining. Therefore, it is possible to perform machining suitable to low speed and heavy duty cutting. On the other hand, when the second drive motor only is driven in a state where the coupling means is caused to perform the uncoupling operation, since the second rotor of the second drive motor is smaller in mass than the first rotor of the first drive motor, acceleration or deceleration of the rotation of the spindle is fast and so on. Thus, it is possible to perform machining suitable to high speed and light duty cutting. Therefore, it is possible to correspond to both the high speed and light duty cutting and the low speed and heavy duty cutting. Further, at the time of the high speed and light duty cutting, the first rotor of the first drive motor large in mass is separated from the spindle, and thus, a force applied to a bearing which supports the spindle to rotate freely is rendered small. As a result, an operating life of the bearing can be made longer.

Further, the controlling means may be configured to cause the coupling means to perform the uncoupling operation, and thereafter, to control the second drive motor to stop the rotation of the spindle.

In this way, in the case where the rotation of the spindle is stopped to change a tool, for example, when the spindle is rotated at least by the first drive motor, the controlling means causes the coupling means to perform the uncoupling operation, and thereafter, controls the second drive motor to stop the rotation of the spindle. As a result, the spindle can be stopped quickly, thereby shortening a time required for changing the tool. The reason for that is that when the first rotor large in mass is separated from the spindle, the rotation of the second rotor (the spindle) can be stopped more quickly than a case where the first rotor is coupled via the coupling means to the spindle.

The controlling means may be configured to individually control the first drive motor and the second drive motor in a state where the coupling means is caused to perform the uncoupling operation such that the rotational speed of the first rotor and that of the second rotor reach previously set rotational speeds, respectively, and thereafter, to cause the coupling means to perform the coupling operation.

In this way, for example, when the spindle is rotated by at least the first drive motor after the tool is changed, the first drive motor and the second drive motor are individually controlled in a state where the controlling means causes the coupling means to perform the uncoupling operation such that the rotational speed of the first rotor and that of the second rotor (spindle) reach previously set values, respectively, and thereafter, the coupling means is caused to perform the coupling operation. This shortens a time required for the rotational speed of the spindle driven by at least the first drive motor to reach a predetermined rotational speed after the tool is changed, thereby shortening a time until a start of machining after the tool is changed. The reason for that is that the first rotor and the second rotor (the spindle) are individually rotated, and thereby, the rotational speed of the first rotor and that of the second rotor (the spindle) can be more quickly increased to the predetermined rotational speed than a case where the first rotor is coupled via the coupling means to the spindle. It is noted that the controlling means may be configured to cause the coupling means to perform the uncoupling operation at the time of the change of the tool, and thereafter, to control the first drive motor such that the rotational speed of the first rotor reaches a previously set value. On the other hand, the controlling mean may be configured to control the second drive motor such that the rotation of the second rotor (the spindle) is once stopped, and thereafter, the rotational speed of the second rotor (the spindle) reaches a previously set speed, and subsequently, the coupling means is caused to perform the coupling operation.

As described above, according to the spindle device of the present invention, it is possible to alleviate a shock caused as a result of a collision between a tool and a workpiece, thereby preventing a serious accident; to prevent an excessive load from being applied to a drive motor, and thus, the drive motor is damaged; to limit a maximum value of torque applied to a spindle to a certain value or less, thereby limiting a force applied to a bearing to a certain value or less to prevent an operating life of the bearing from being shortened; to easily adjust the maximum value of torque applied to the spindle and a maximum value of a force applied to a bearing; to facilitate attaching and detaching a tool; to configure such that the device is simple and compact; to correspond to both high speed and light duty cutting and low speed and heavy duty cutting; and to shorten a time required for increasing a rotational speed of the spindle to that previously set and for stopping the rotation of the spindle, thereby shortening a time required for changing a tool and a time until a start of machining after the change of the tool.

DETAILED DESCRIPTION OF THE INVENTION

Figure 1:
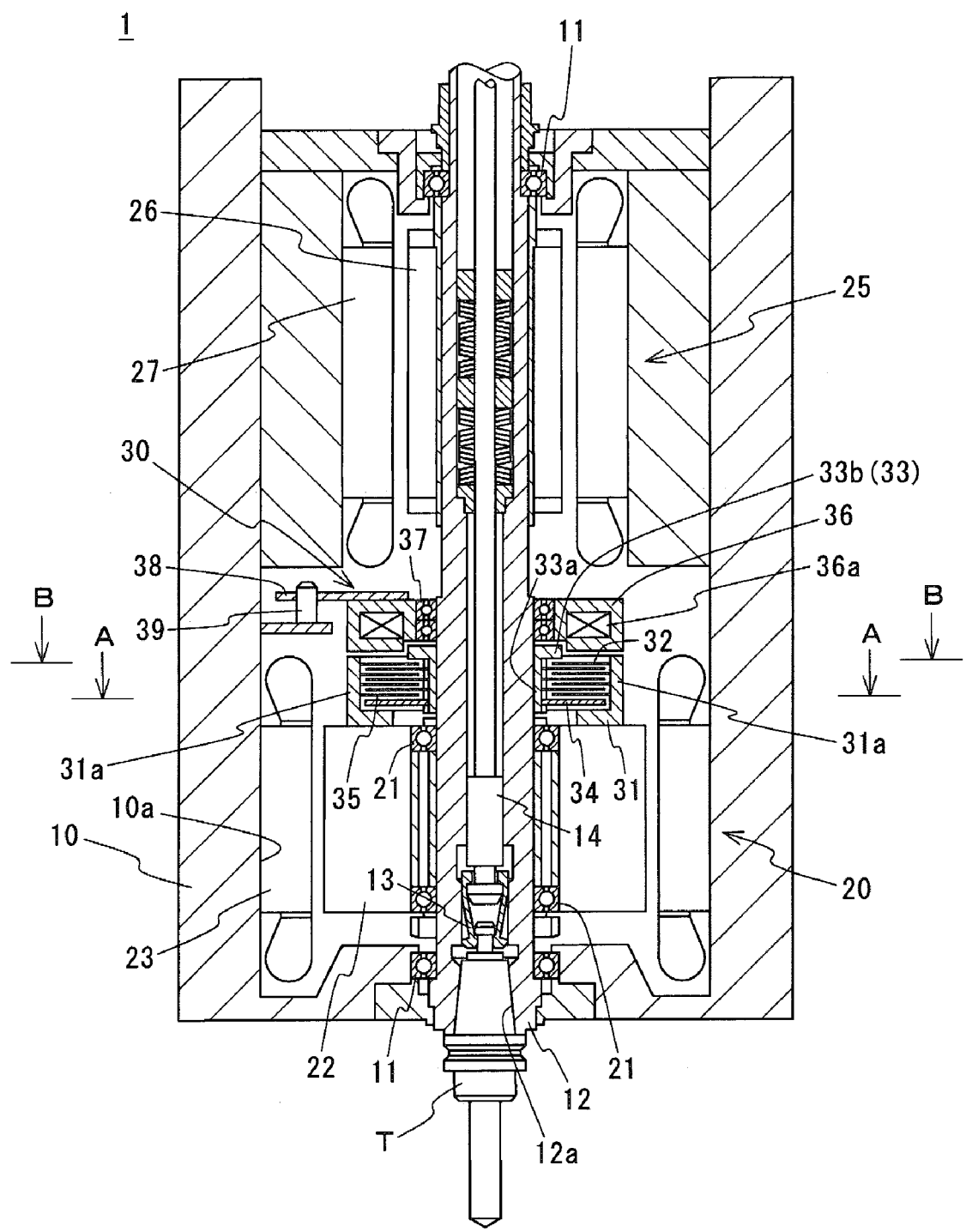
FIG. 1 is a cross-sectional view showing a schematic configuration of a spindle device according to one embodiment of the present invention.
Figure 2:
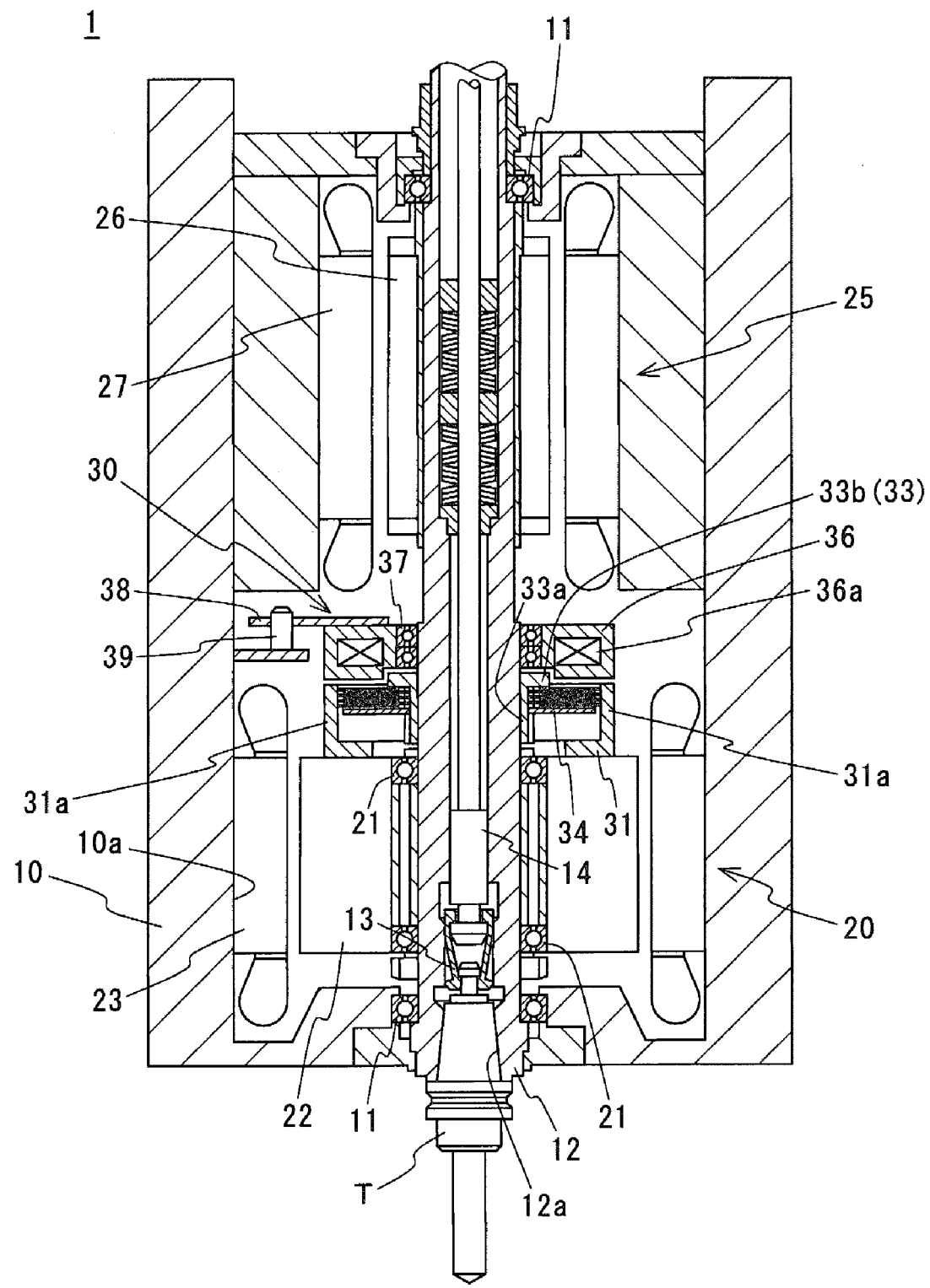
FIG. 2 is a cross-sectional view showing a schematic configuration of the spindle device according to one embodiment of the present invention.
Figure 3:
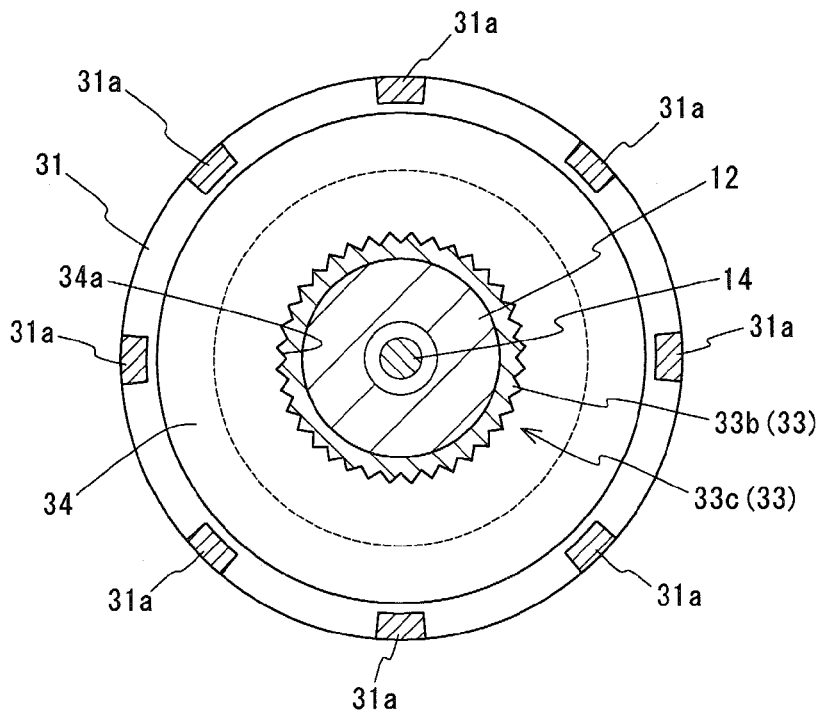
FIG. 3 is a cross-sectional view as viewed in the arrow A-A direction in FIG. 1.
Figure 4:
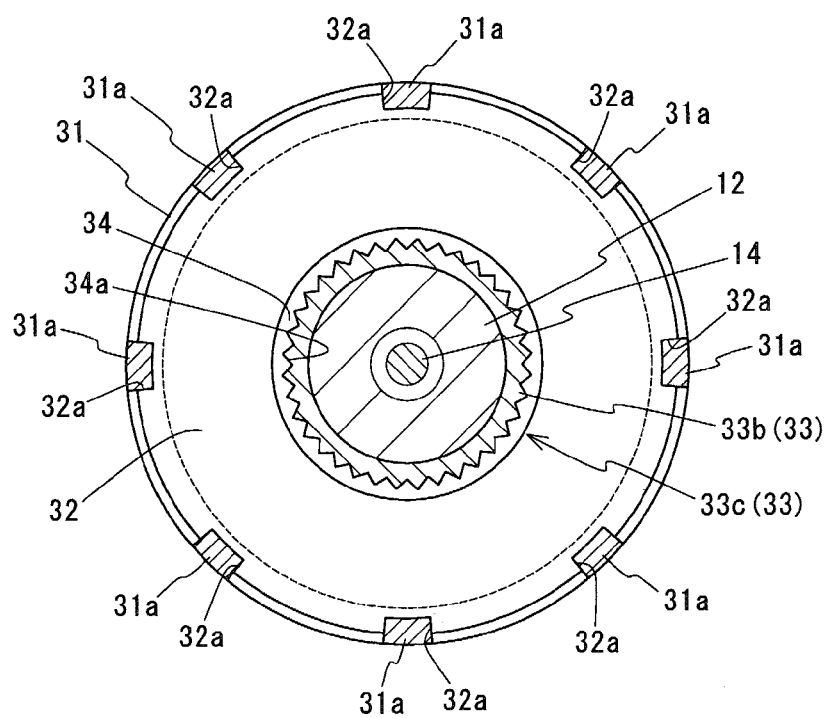
FIG. 4 is a cross-sectional view as viewed in the arrow B-B direction in FIG. 1.
Figure 5:
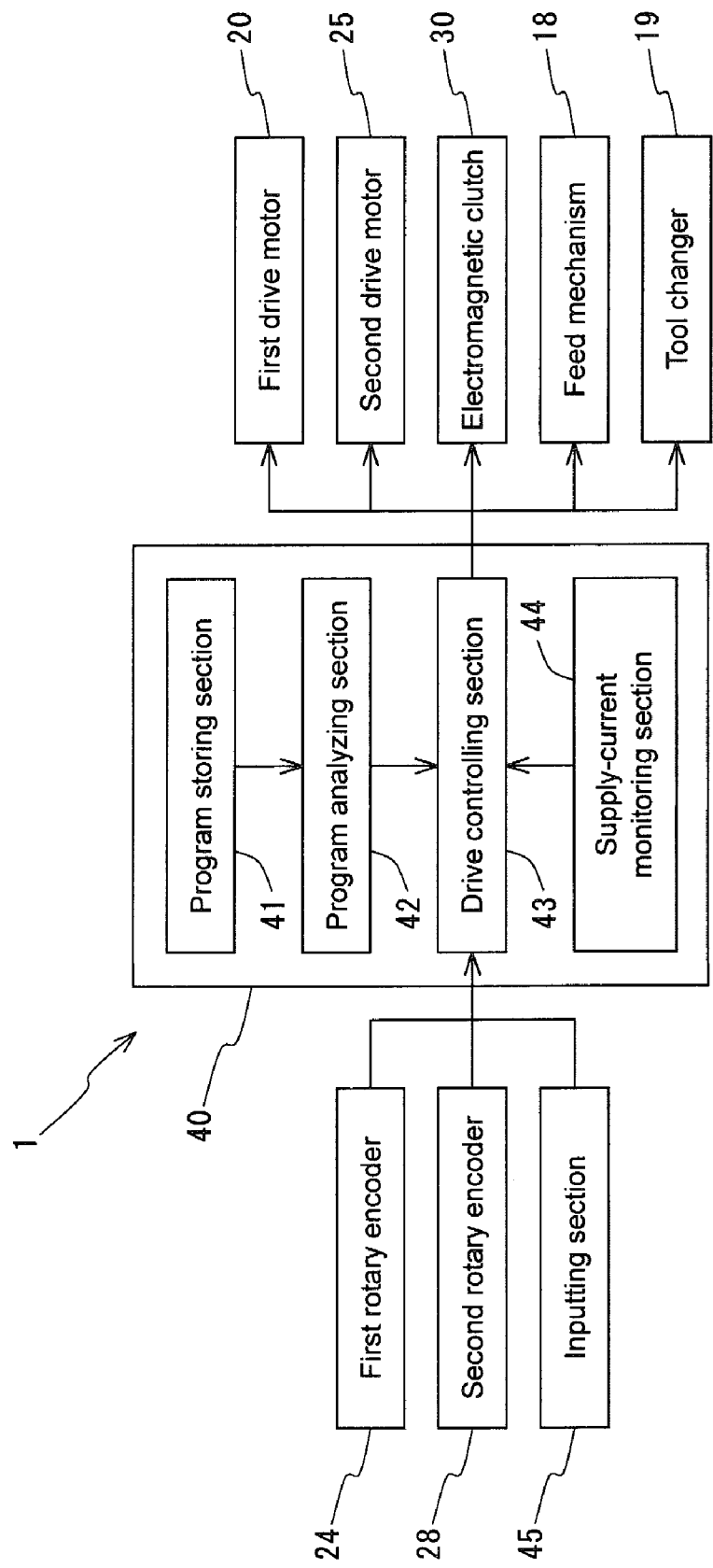
FIG. 5 is a block diagram showing a schematic configuration of the spindle device or the like according to the embodiment.

Hereinafter, a preferred embodiment of the present invention will be described with reference to the accompanying drawings. FIG. 1 and FIG. 2 are cross-sectional views each showing a schematic configuration of a spindle device according to one embodiment of the present invention; FIG. 3 is a cross-sectional view as viewed in the arrow A-A direction in FIG. 1; FIG. 4 is a cross-sectional view as viewed in the arrow B-B direction in FIG. 1; and FIG. 5 is a block diagram showing a schematic configuration of the spindle device or the like according to the embodiment.

As shown in FIG. 1 to FIG. 5, a spindle device 1 of the embodiment is configured by: a housing 10 formed with a support hole 10a; a spindle 12 which is supported to rotate freely about an axis via a bearing 11 within the support hole 10a of the housing 10 and of which distal end is attached with a tool T; two drive motors 20 and 25 for rotating the spindle 12 about the axis, i.e., the first drive motor 20 disposed on a distal end side of the spindle 12 and the second drive motor 25 disposed on a rear end side thereof; an electromagnetic clutch 30, disposed between the first drive motor 20 and the second drive motor 25, for transmitting a drive force of the first drive motor 20 intermittently to the spindle 12; a controlling device 40 for controlling operations of the first drive motor 20, the second drive motor 25, and the electromagnetic clutch 30; and other components. For example, the spindle device 1 is arranged in a machine tool (not shown) configured by: a table (not shown) on which a workpiece (not shown) is mounted; a feed mechanism 18 for moving the spindle device 1 and the table relative to each other in three orthogonal axial directions; a tool changer 19 for changing the tool T attached to the spindle 12 of the spindle device 1 with a new tool; and other components.

The spindle 12 is provided with a tapered hole 12a which opens to its distal end surface. Inside of the tapered hole 12a, a collet 13, a drawbar 14, etc., for holding and fixing the tool T inserted in the tapered hole 12a are disposed. The collet 13 is configured such that a distal end thereof can hold a rear end of the tool T. The drawbar 14 is arranged to be engaged with the collet 13. When the collet 13 and the drawbar 14 are moved by an appropriate drive mechanism (not shown) to the rear end side of the spindle 12, the distal end of the collet 13 is closed, and the rear end of the tool T is held by the collet 13 and drawn to an inner side of the tapered hole 12a. Thereby, the tool T is attached to the spindle 12. On the other hand, when the collet 13 and the drawbar 14 are moved by the appropriate drive mechanism (not shown) to the distal end side of the spindle 12, the distal end of the collet 13 is opened, thereby making it possible to remove the tool T from the spindle 12.

The first drive motor 20 is configured by: a first rotor 22 arranged on an outer circumferential surface on the distal end side of the spindle 12 to rotate freely via a bearing 21; and a first stator 23 which is fixedly provided an inner circumferential surface of the support hole 10a of the housing 10 in a manner to be kept apart by a certain interval in a radially outward direction from an outer circumferential surface of the first rotor 22 such that the first rotor 22 is surrounded. The first drive motor 20 is configured such that when a current is supplied to the first stator 23, the first rotor 22 is rotated. The first rotor 22 is configured such that a weight is appropriately attached thereto to increase a mass thereof. Further, a rotational speed of the first rotor 22 is detected by a first rotary encoder 24.

The second drive motor 25 is configured by a second rotor 26 fixedly provided on an outer circumferential surface on the rear end side of the spindle 12, and being smaller in mass than the first rotor 22; and a second stator 27 which is fixedly provided on the inner circumferential surface of the support hole 10a of the housing 10 in a manner to be kept apart by a certain interval in a radially outward direction from an outer circumferential surface of the second rotor 26 such that the second rotor 26 is surrounded. The second drive motor 20 is configured such that when a current is supplied to the second stator 27, the second rotor 26 is rotated. A rotational speed of the second rotor 26 (that is, the spindle 12) is detected by a second rotary encoder 28.

The electromagnetic clutch 30 is configured by: an annular spider 31 fixedly provided on an end surface on a side of the second drive motor 25 of the first rotor 22; a plurality of outer disks 32 which are annularly formed and are held by the spider 31; a rotor 33 which is fixedly provided on an outer circumferential surface of the spindle 12 and which freely rotates integrally with the spindle 12; an annular armature 34 held by the rotor 33; a plurality of inner disks 35 which are annularly formed and are held by the rotor 33; and an annular stator 36 which contains a coil 36a for attracting the armature 34 by a predetermined attraction force when a current is supplied thereto. The spider 31, the outer disks 32, the armature 34, the inner disks 35, and the stator 36 are disposed coaxially of the spindle 12.

The spider 31 is formed on its outer circumferential side with a plurality of engaging portions 31a protruded toward a side of the second drive motor 25. The outer disks 32 are provided with a plurality of engaging portions 32a dented from the outer circumferential side to the inner circumferential side, and each engaged with the engaging portions 31a of the spider 31 and are arranged to move freely in an axial direction of the spindle 12. The rotor 33 is provided with a small diameter portion 33a on a side of the first drive motor 20 and a large diameter portion 33b on a side of the second drive motor 25. The rotor 33 is disposed so that the small diameter portion 33a and the engaging portions 31a of the spider 31 are facing each other in a radial direction. The small diameter portion 33a is formed on its outer circumferential surface with a plurality of teeth 33c. The large diameter portion 33b is formed to be larger than an inner diameter of the outer disks 32.

The armature 34 and the inner disks 35 are each formed on its inner circumferential surface with a plurality of teeth 34a and 35a, each of which is meshed with the teeth 33c of the small diameter portion 33a of the rotor 33, and are arranged to move freely in the axial direction of the spindle 12. The armature 34 is disposed to face the outer disk 32 at a location closest to a side of the spider 31. The outer disks 32 and the inner disks 35 are disposed alternately to face each other. An end surface on the inner circumferential side of the outer disk 32 disposed closest to a side of the large diameter portion 33b of the rotor 33 is in contact with the end surface of the large diameter portion 33b, and thus, movement of the outer disk 32 in the axial direction of the spindle 12 is restricted.

The stator 36 is disposed to be kept apart by a certain interval to face the outer disk 32 disposed closest to the side of the large diameter portion 33b of the rotor 33. To accommodate the rotation of the spindle 12, the stator 36 is supported to rotate freely via the bearing 37 on the outer circumferential surface of the spindle 12. The stator 36 is configured not to rotate as a result of an engaging relationship between a detent arm 38 attached to the stator 36 and a detent pin 39 attached to the inner circumferential surface of the support hole 10a of the housing 10.

In the electromagnetic clutch 30, when a current is supplied to the coil 36a of the stator 36, the armature 34 is attracted to a side of the stator 36 by a predetermined attraction force, and thus, moved to the axial direction of the spindle 12. Thereby, the armature 34, the inner disks 35, and the outer disks 32 are brought into contact to one another by a predetermined contact force. As a result, the first rotor 22 of the first drive motor 20, and the spindle 12 are coupled (see FIG. 2). On the other hand, when the conduction to the coil 36a is canceled, the armature 34 is not attracted to the stator 36 side, thereby eliminating the contact force acted between the armature 34, and the inner disks 35 and the outer disks 32. As a result, the first rotor 22 and the spindle 12 are uncoupled (see FIG. 1). In this way, a coupling operation for coupling the first rotor 22 and the spindle 12 and an uncoupling operation for uncoupling between the first rotor 22 and the spindle 12 are performed.

In a state where the coupling operation is performed, the rotational force of the first rotor 22 is transmitted by a friction force acted between the armature 34, and the inner disks 35 and the outer disks 32 via the spider 31, the outer disks 32, the armature 34, the inner disks 35, and the rotor 33 to the spindle 12. In a state where the uncoupling operation is performed, the rotational force of the first rotor 22 is not transmitted to the spindle 12.

In addition to operations of the first drive motor 20, the second drive motor 25 and the electromagnetic clutch 30, the controlling device 40 is configured to control operations of the feed mechanism 18 and the tool changer 19. The controlling device 40 is provided with: a program storing section 41; a program analyzing section 42; a drive controlling section 43; and a supply-current monitoring section 44.

The program storing section 41 is stored with an NC program appropriately generated in advance. The program analyzing section 42 analyzes the NC program stored in the program storing section 41 to extract operation commands relating to a moving position and a feed speed of the table, a moving position and a feed speed of the spindle device 1, a rotation of the spindle 12, a rotation of the first drive motor 20, the operation of the electromagnetic clutch 30, the change of the tool or the like.

The drive controlling section 43 controls operations of the first drive motor 20, the second drive motor 25, the electromagnetic clutch 30, the feed mechanism 18, and the tool changer 19 based on the operation command extracted by the program analyzing section 42.

Specifically, with regard to the rotation of the spindle 12, the first drive motor 20 is controlled based on the rotational speed detected by the first rotary encoder 24 and the operation command; the second drive motor 25 is controlled based on the rotational speed detected by the second rotary encoder 28 and the operation command; and the first drive motor 20 and the second drive motor 25 are synchronized to be controlled based on the rotational speed detected by the second rotary encoder 28 and the operation command. With regard to the rotation of the first drive motor 20 (when the spindle 12 and the first rotor 22 are not coupled and when the first rotor 22 only is rotated), the first drive motor 20 is controlled based on the rotational speed detected by the first rotary encoder 24 and the operation command. With regard to the operation of the electromagnetic clutch 30, the conduction to the coil 36a of the stator 36 is controlled based on the operation command relating to the coupling operation and the uncoupling operation, and thereby, the coupling operation is performed when the current is supplied to the coil 36a, and the uncoupling operation is performed when the conduction to the coil 36a is canceled. With regard to the change of the tool, the tool changer 19 is controlled based on the operation command to change the tool T attached to the spindle 12.

Specific examples of the control based on the operation command include the following modes, for example: that is, the drive controlling section 43 rotates the spindle 12 about the axis by switching between when the first drive motor 20 or the first drive motor 20 and the second drive motor 25 are driven in a state where the electromagnetic clutch 30 is caused to perform the coupling operation and when the second drive motor 25 only is driven in a state where the electromagnetic clutch 30 is caused to perform the uncoupling operation; in the case where the rotation of the spindle 12 is stopped to change the tool, when the spindle 12 is rotated by the first drive motor 20 or the first drive motor 20 and the second drive motor 25, the electromagnetic clutch 30 is caused to perform the uncoupling operation, and thereafter, the second drive motor 25 is controlled to stop the rotation of the spindle 12; and when the spindle 12 is rotated by the first drive motor 20 or the first drive motor 20 and the second drive motor 25 after the change of the tool, the electromagnetic clutch 30 is caused to perform the uncoupling operation at the time of the change of the tool, and thereafter, the first drive motor 20 is controlled such that the rotational speed of the first rotor 22 reaches a predetermined speed, and on the other hand, the second drive motor 25 is controlled such that the rotation of the second rotor 26 (the spindle 12) is once stopped to change the tool T, and thereafter, the rotational speed of the second drive rotor 26 (the spindle 12) reaches a predetermined speed, and subsequently, the electromagnetic clutch 30 is caused to perform the coupling operation.

It is noted that with regard to the first drive motor 20 and the second drive motor 25, the drive controlling section 43 controls the first drive motor 20 and the second drive motor 25 by controlling a current supplied to each of the first stator 23 and the second stator 27. That is, the drive controlling section 43 controls the rotation of the first rotor 22 and that of the second rotor 26. In the case where the electromagnetic clutch 30 is caused to perform the coupling operation in a state where the first rotor 22 and the second rotor 26 are rotated, no inconvenience is generated at all if a difference between the rotational speed detected by the first rotary encoder 24 and that detected by the second rotary encoder 28 remains within a certain range.

Further, the drive controlling section 43 is configured to be also capable of performing the control similar to those in the specific examples by an input signal inputted from the inputting section 45. Further, based on an attraction-force setting signal inputted from the inputting section 45, the drive controlling section 43 adjusts the current supplied to the coil 36a of the stator 36 such that the attraction force reaches that which corresponds to the attraction-force setting signal, thereby adjusting the contact force. When receiving an uncoupling signal from the supply-current monitoring section 44, the drive controlling section 43 causes the electromagnetic clutch 30 to perform the uncoupling operation.

The supply-current monitoring section 44 monitors a current which is supplied by the drive controlling section 43 to the first stator 23, and when the supplied current becomes larger than a previously set value, the supply-current monitoring section 44 transmits the uncoupling signal to the drive controlling section 43. When the spindle 12 is rotated by the first drive motor 20 or the first drive motor 20 and the second drive motor 25 to machine a workpiece, and if a load of the first drive motor 20 becomes large due to a collision between the tool T and the workpiece, for example, the current supplied to the first stator 23 becomes larger than the previously set value. Thus, the supply-current monitoring section 44 detects the collision between the tool T and the workpiece by monitoring the current supplied to the first stator 23.

As described in detail above, according to the spindle device 1 of the embodiment, under the control of the controlling device 40, the spindle 12 is adapted to rotate about the axis by switching between when the first drive motor 20 or the first drive motor 20 and the second drive motor 25 are driven in a state where the electromagnetic clutch 30 is caused to perform the coupling operation and when the second drive motor 25 only is driven in a state where the electromagnetic clutch 30 is caused to perform the uncoupling operation. Therefore, when the first drive motor 20 or the first drive motor 20 and the second drive motor 25 are driven in a state where the electromagnetic clutch 30 is caused to perform the coupling operation, since the first rotor 22 of the first drive motor 20 is larger in mass than the second rotor 26 of the second drive motor 25, the rotational speed of the spindle 12 is stabled and so on in spite of a variation in load or a shock resulting from an interrupted cutting in machining. Therefore, it is possible to perform machining suitable to low speed and heavy duty cutting. On the other hand, when the second drive motor 25 only is driven in a state where the electromagnetic clutch 30 is caused to perform the uncoupling operation, since the second rotor 26 of the second drive motor 25 is smaller in mass than the first rotor 22 of the first drive motor 20, acceleration or deceleration of the rotation of the spindle 12 is fast and so on, thereby performing machining suitable to high speed and light duty cutting. Therefore, it is possible to correspond to both the high speed and light duty cutting and the low speed and heavy duty cutting. Further, at the time of the high speed and light duty cutting, the first rotor 22 large in mass is separated from the spindle 12, and thus, a force applied to the bearing 11 is small. As a result, an operating life of the bearing 11 can be made longer.

Further, in the case where the spindle 12 is stopped to change the tool, when the spindle 12 is rotated by the first drive motor 20 or the first drive motor 20 and the second drive motor 25, the electromagnetic clutch 30 is caused to perform the uncoupling operation, and thereafter, the second drive motor 25 is controlled to stop the rotation of the spindle 12. Therefore, the spindle 12 can be quickly stopped, thereby shortening a time required for changing the tool. The reason for that is that when the first rotor 22 large in mass is separated from the spindle 12, the rotation of the second rotor 26 (the spindle 12) can be stopped more quickly than a case where the first rotor 22 is coupled via the electromagnetic clutch 30 to the spindle 12.

Further, when the spindle 12 is rotated by first drive motor 20 or the first drive motor 20 and the second drive motor 25 after the change of the tool, the electromagnetic clutch 30 is caused to perform the uncoupling operation at the time of changing the tool, and thereafter, the first drive motor 20 is controlled such that the rotational speed of the first rotor 22 reaches a predetermined speed. On the other hand, The second drive motor 25 is controlled such that the rotation of the second rotor 26 (the spindle 12) is once stopped to change the tool T, and thereafter, the rotational speed of the second drive motor 26 (the spindle 12) reaches a predetermined speed, and subsequently, the electromagnetic clutch 30 is caused to perform the coupling operation. Therefore, a time required for the rotational speed of the spindle 12 driven by the first drive motor 20 or the first drive motor 20 and the second drive motor 25 to reach a predetermined rotational speed after the change of the tool can be shortened, thereby shortening a time until a start of machining after the change of the tool. The reason for that is that the first rotor 22 and the second rotor 26 (the spindle 12) are individually rotated, and thereby, the rotational speed of the first rotor 22 and that of the second rotor 26 (the spindle 12) can be more quickly increased to the predetermined rotational speed than a case where the first rotor 22 is coupled via the electromagnetic clutch 30 to the spindle 12.

Further, the supply-current monitoring section 44 monitors the current which is supplied by the drive controlling section 43 to the first rotor 22, and when the supplied current becomes larger than a previously determined value, the uncoupling signal is transmitted to the drive controlling section 43. The drive controlling section 43 that receives the uncoupling signal causes the electromagnetic clutch 30 to perform the uncoupling operation. Thus, it is possible that the rotational force of the first rotor 22 is not transmitted to the spindle 12 immediately after a collision between the tool T and the workpiece, for example, thereby alleviating an impact resulting from the collision. As a result, it is possible to prevent a serious accident. Further, it is possible to prevent an excessive load from being applied to the first drive motor 20, and thus, the first drive motor 20 is damaged.

Since it is designed such that the armature 34, and the inner disks 35 and the outer disks 32 are brought into contact by a predetermined contact force, and thereby, the rotational force of the first rotor 22 is transmitted to the spindle 12. Therefore, a maximum value of torque applied to the spindle 12 can be limited to a certain value or less. The reason for that is that when the spindle 12 is rotated by the first drive motor 20, the spindle 12 is applied torque which corresponds to the rotational force of the first rotor 22, and when torque applied to the spindle 12 becomes large, transmittable torque is exceeded by a friction force acted between the armature 34, and the inner disks 35 and the outer disks 32, and as a result, skidding is generated between the armature 34, and the inner disks 35 and the outer disks 32. In this case, when the maximum value of torque applied to the spindle 12 is limited to a certain value or less, a force applied to the bearing 11 can also be limited to a certain value or less. As a result, it is possible to effectively prevent a problem such as the operating life of the bearing 11 is shortened, and so on.

Further, when the attraction-force setting signal is inputted from the inputting section 45, the attraction force by which the coil 36a of the stator 36 attracts the armature 34, that is, a contact force acted between the armature 34, and the inner disks 35 and the outer disks 32, can be adjusted. Thus, when the contact force is rendered large, the friction force acted between the armature 34, and the inner disks 35 and the outer disks 32 becomes large. As a result, the maximum value of torque transmittable by the electromagnetic clutch 30 can be rendered large. When the contact force is rendered small, the friction force acted between the armature 34, and the inner disks 35 and the outer disks 32 becomes small. As a result, the maximum value of torque transmittable by the electromagnetic clutch 30 can be rendered small. In this way, when the maximum value of transmittable torque is adjusted, the maximum value of torque applied to the spindle 12 and that of the force acted on the bearing 11 can be easily adjusted.

Further, by means of the electromagnetic clutch 30, a state where the rotational force is applied to the spindle 12 by the first drive motor 20 or the first drive motor 20 and the second drive motor 25 and that where the rotational force is applied to the spindle 12 by the second drive motor 25 are switched, and thus, such a switch can be realized by a simple and compact structure.

Thus, one embodiment of the present invention has been described above. However, specific modes in which the present invention can be realized are not limited thereto.

Figure 6:
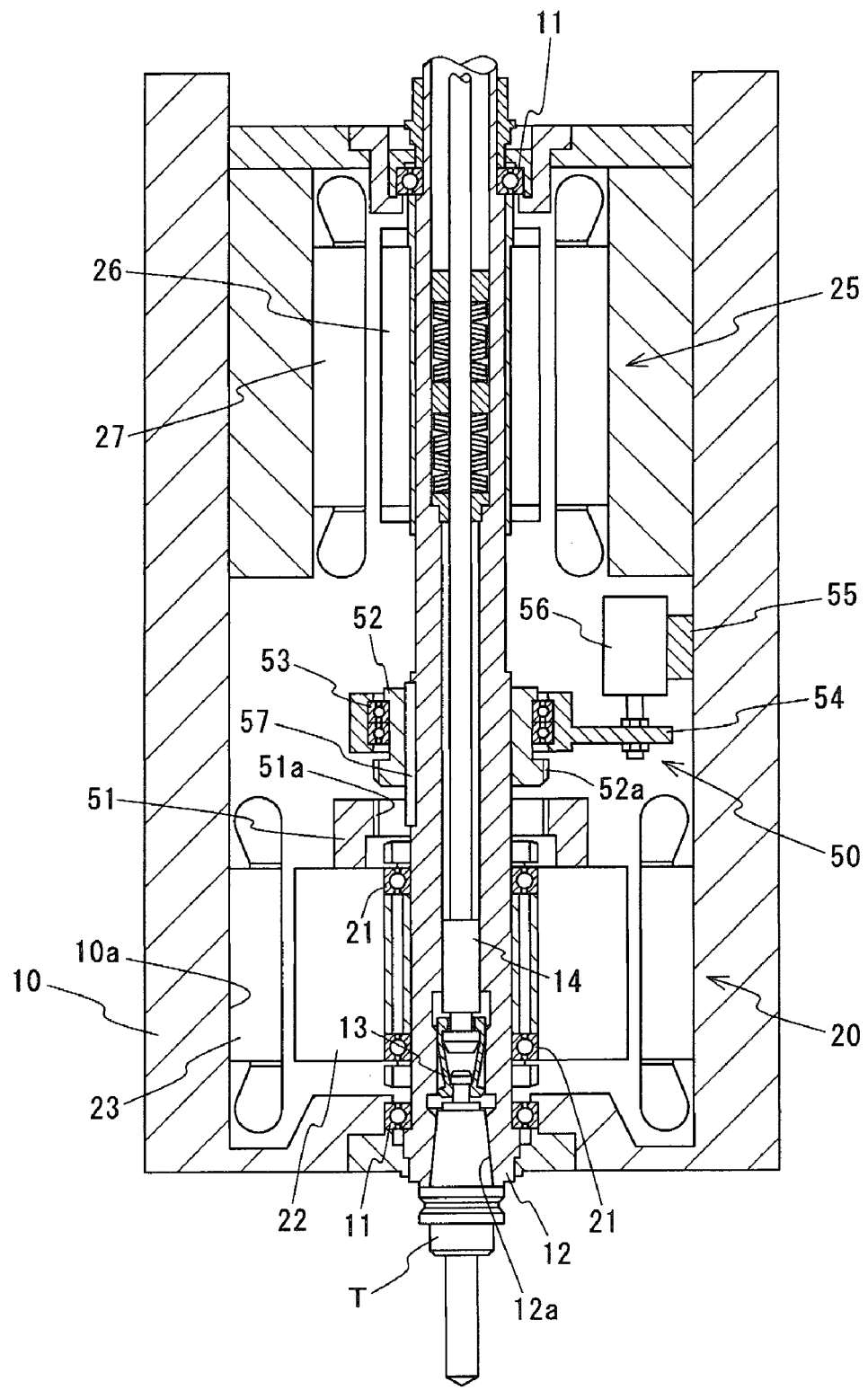
FIG. 6 is a cross-sectional view showing a schematic configuration of a spindle device according to another embodiment of the present invention.
Figure 7:
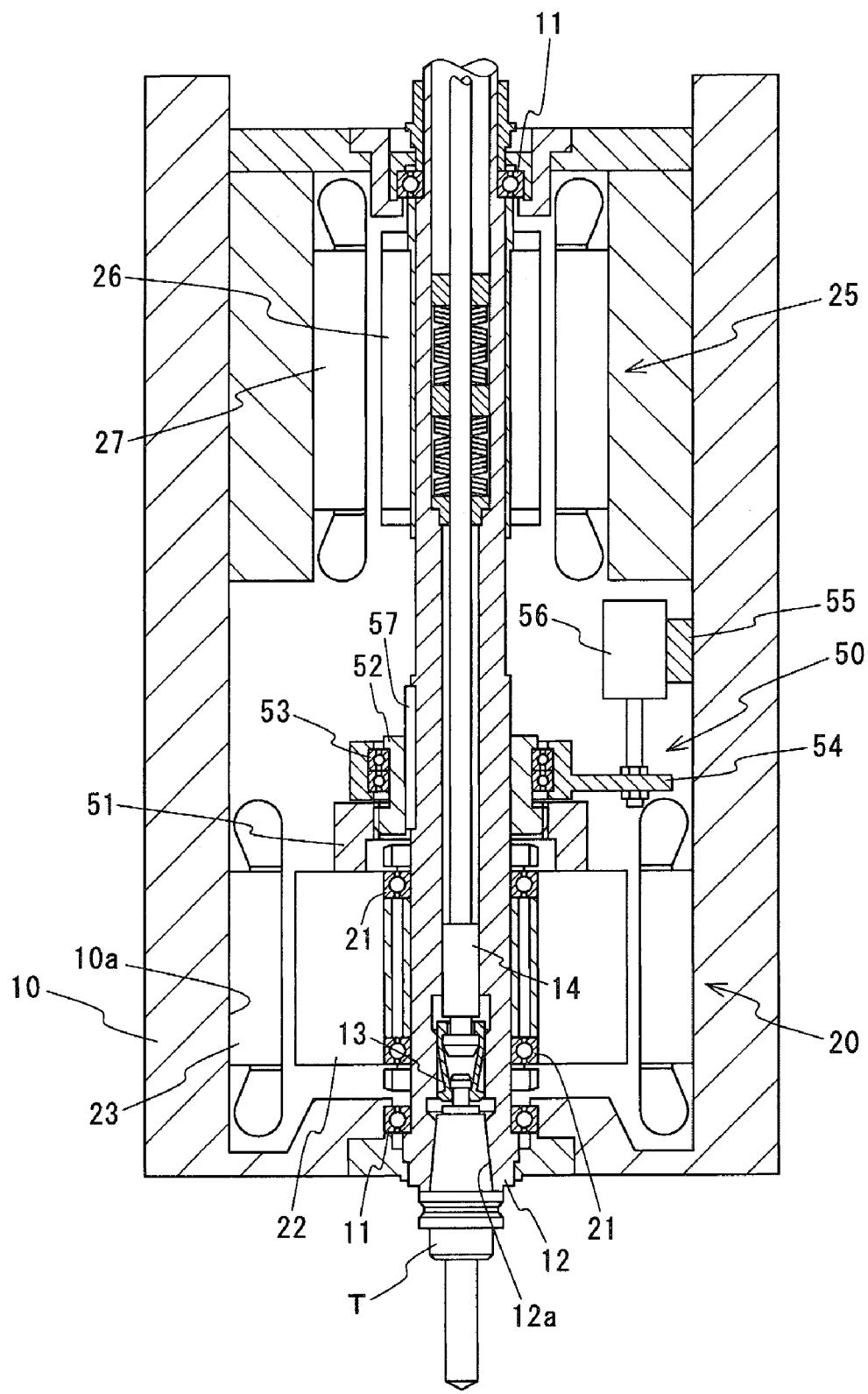
FIG. 7 is a cross-sectional view showing a schematic configuration of the spindle device according to another embodiment of the present invention.

For example, instead of the electromagnetic clutch 30, a coupling mechanism 50 shown in FIG. 6 and FIG. 7 may be used to intermittently transmit the drive force of the first drive motor 20 to the spindle 12. As shown in FIG. 6 and FIG. 7, the coupling mechanism 50 is configured by: a first coupling member 51 which is configured by an annular member fixedly provided on an end surface on a side of the second drive motor 25 of the first rotor 22 of the first drive motor 20, and of which inner circumferential surface is formed with a plurality of teeth 51a; a second coupling member 52 which is arranged on the outer circumferential surface of the spindle 12 between the first drive motor 20 and the second drive motor 25 to rotate integrally with the spindle 12 and to move freely in an axial direction of the spindle 12 and which is formed on the outer circumferential surface on the distal end side of the spindle 12 with a plurality of teeth 52a to be meshed with the teeth 51a of the first coupling member 51; a support member 54 which supports to rotate freely the second coupling member 52 via a bearing 53; and a drive cylinder 56 which is attached via a bracket 55 to the inner circumferential surface of the support hole 10a of the housing 10 and which moves the support member 54 in the axial direction of the spindle 12 to move the second coupling member 52 in the same direction. The second coupling member 52 is configured to rotate, together with the spindle 12, by a key 57.

In the coupling mechanism 50 thus configured, when the support member 54 is moved by the drive cylinder 56 toward the distal end side of the spindle 12, the second coupling member 52 is moved in the same direction. In this case, the teeth 52a of the second coupling member 52 and the teeth 51a of the first coupling member 51 are meshed, thereby coupling the first rotor 22 of the first drive motor 20 and the spindle 12, as shown in FIG. 7. On the other hand, when the support member 54 is moved to the rear end side of the spindle 12 by the drive cylinder 56, the second coupling member 52 is moved in the same direction. In this case, the meshing of the teeth 52a of the second coupling member 52 and the teeth 51a of the first coupling member 51 is canceled, thereby uncoupling between the first rotor 22 and the spindle 12, as shown in FIG. 6. In this way, a coupling operation for coupling the first rotor 22 and the spindle 12 and an uncoupling operation for uncoupling between the first rotor 22 and the spindle 12 are performed.

In a state where the coupling operation is performed, the rotational force of the first rotor 22 is transmitted via the first coupling member 51 and the second coupling member 52 to the spindle 12. In a state where the uncoupling operation is performed, the rotational force of the first rotor 22 is not transmitted to the spindle 12.

The drive controlling section 43 controls an operation of the drive cylinder 56 based on an operation command relating to the coupling operation and the uncoupling operation to control the coupling operation and the uncoupling operation. The drive controlling section 43 further controls the coupling operation and the uncoupling operation based on a rotational speed and rotational angle position of the first rotor 22 detected by the first rotary encoder 24 and a rotational speed and rotational angle position of the second rotor 26 detected by the second rotary encoder 28.

Figure 8:
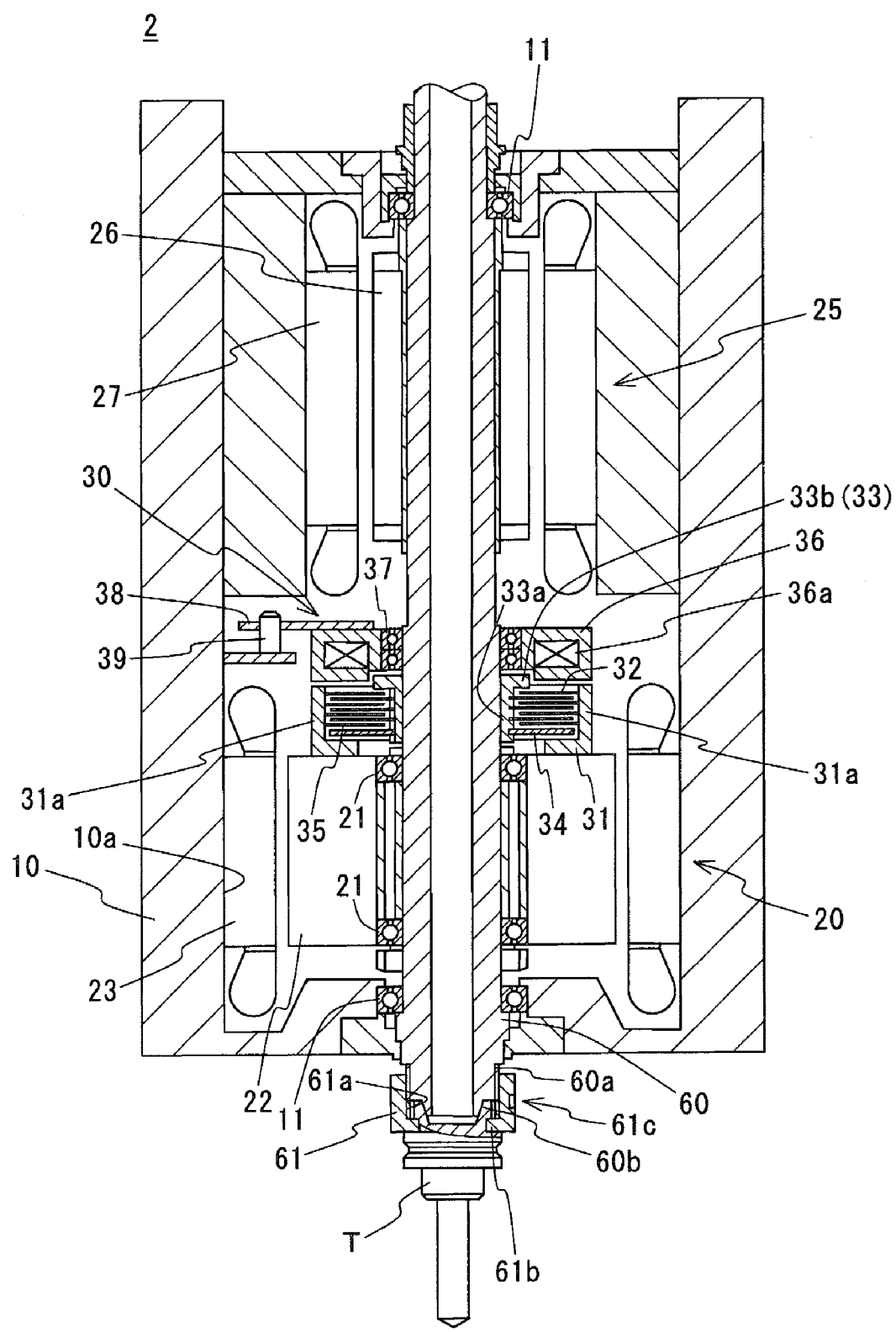
FIG. 8 is a cross-sectional view showing a schematic configuration of a spindle device according to another embodiment of the present invention.

For example, the spindle device 1 can be a spindle device 2 provided with a spindle 60 to which the tool T is attached by means of a screw connection, as shown in FIG. 8. As shown in FIG. 8, the spindle 60 is formed in its distal end with a screw groove 60a and a tapered surface 60b. The screw groove 60a is fitted together by screwing with an annular tool attaching member 61 which is formed with a screw groove 61a in its an inner circumferential surface, and which is provided with an engaging portion 61b engaged with an outer circumferential surface of a rear end of the tool T in its lower-end inner circumferential portion. The tapered surface 60b is in contact with the rear end of the tool T. The tool T is attached to the spindle 60 when the tool attaching member 61 is fitted together by screwing with the screw groove 60a at the distal end of the spindle 60. It is noted that the spindle 60 is not limited to a mode shown in FIG. 8, and may be configured such that the tool T is directly attached by means of a screw connection, without being via the tool attaching member 61.

In this case, the drive controlling section 43 is configured such that based on the operation command in the NC program or the input signal inputted from the inputting section 45, the electromagnetic clutch 30 is caused to perform the uncoupling operation, and in this state, the first drive motor 20 is driven to rotate the first rotor 22 only, and thereafter, the electromagnetic clutch 30 is caused to perform the coupling operation.

In this way, the first drive motor 20 is driven to rotate the first rotor 22 only, and thereafter, the electromagnetic clutch 30 is caused to perform the coupling operation to couple the first rotor 22 and the spindle 60. As a result, the non-rotating spindle 60 can be abruptly rotated and an impulsive force resulting from the abrupt rotation can be applied to the non-rotating spindle 60. Thereby, even when the tool T is tightened to the spindle 60, the tool T can be easily loosened, and in addition, the tool T can be easily attached to the spindle 60. Thus, attaching and detaching the tool T can be easily performed. When the spindle 60 is rotated, a pin (not shown) is appropriately inserted into a concave portion 61c formed on an outer circumferential surface of the tool-attaching member 61, and so on. Thus, the tool-attaching member 61 is maintained in a non-rotating manner.

Figure 9:
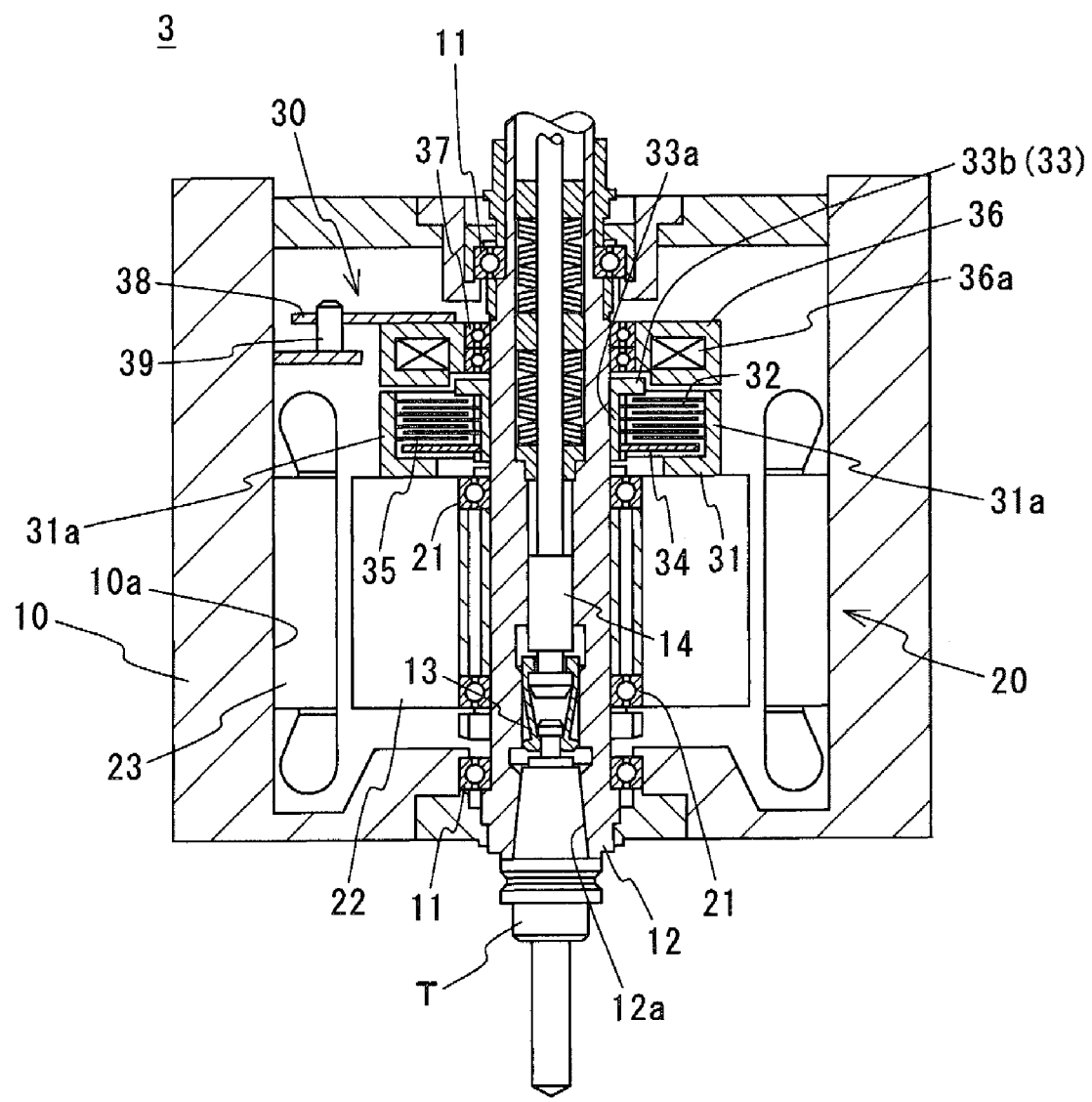
FIG. 9 is a cross-sectional view showing a schematic configuration of a spindle device according to another embodiment of the present invention.

The spindle device 1 can be a spindle device 3 in which the second drive motor 25 is omitted, as shown in FIG. 9. With such a spindle device 3, the rotational force of the first rotor 22 can not be transmitted to the spindle 12 immediately after the collision between the tool T and the workpiece; an excessive load is prevented from being applied to the first drive motor 20, and thus, the first drive motor 20 is damaged; the maximum value of torque applied to the spindle 12 is limited to a certain value or less, and thus, the force applied to the bearing 11 can be limited to a certain value or less; the maximum value of torque transmittable by the electromagnetic clutch 30 is adjusted to easily adjust the maximum value of torque applied to the spindle 12 and the maximum value of the force applied to the bearing 11; and the attaching and detaching the tool T can be easily performed, for example.

In the above-described embodiment, the first drive motor 20 provided with the first rotor 22 large in mass is disposed on the distal end side of the spindle 12, and the second drive motor 25 provided with the second rotor 26 small in mass is disposed on the rear end side thereof. However, the first drive motor 20 may be disposed on the rear end side of the spindle 12, and the second drive motor 25 may be disposed on the distal end side thereof. However, in view of machining accuracy, it is preferable that the first drive motor 20 be disposed on the distal end side of the spindle 12, and the second drive motor 25 be disposed on the rear end side thereof.

Specific controlling examples by the drive controlling section 43 are not limited to the above-described modes. Further, the above-described embodiment is configured such that the drive controlling section 43 controls the rotation of the spindle 12, that of the first drive motor 20, and the coupling and uncoupling operations of the electromagnetic clutch 30 based on the operation command in the NC program. However, the configuration thereof is not limited thereto.

What is claimed is:

1. A spindle device, comprising:
a housing formed with a support hole;
a spindle which is supported to rotate freely about an axis within the support hole of the housing and to which a tool is attached;
a first drive motor for rotating the spindle about the axis; and
controlling means for controlling an operation of the first drive motor, wherein the first drive motor is configured by a first rotor arranged to rotate freely on an outer circumferential surface of the spindle and a first stator fixedly provided on an inner circumferential surface of the support hole of the housing in a manner to be kept apart by an interval toward a radially outward direction from an outer circumferential surface of the first rotor,
the spindle device comprising coupling means configured to perform a coupling operation for coupling the spindle and the first rotor and an uncoupling operation for uncoupling between the spindle and the first rotor, wherein the controlling means controls the operation of the coupling means.

2. The spindle device according to claim 1, wherein in a state where the coupling means is caused to perform the coupling operation, the controlling means supplies a current to the first rotor or the first stator to rotate the first rotor, and causes the coupling means to perform the uncoupling operation when the current supplied to the first rotor or the first stator becomes larger than a previously set value.

3. The spindle device according to claim 1, wherein
the coupling means is configured by a friction clutch, and
the friction clutch comprises: a first member and a second member configured to be in contact with each other, the first member being connected to the first rotor, and the second member being connected to the outer circumferential surface of the spindle; and a contact mechanism for bringing the first member and the second member into contact by a previously set force at the time of the coupling operation and for canceling the contact force acted between the first member and the second member at the time of the uncoupling operation.

4. The spindle device according to claim 3, wherein
the contact mechanism of the friction clutch is configured to render variable the force for bringing the first member and the second member into contact, and
the controlling means is configured to control the contact mechanism of the friction clutch to change a contact force between the first member and the second member.

5. The spindle device according to claim 1, wherein
the spindle is configured to be attached with the tool by means of a screw connection, and
the controlling means is configured such that in a state where the coupling means is caused to perform the uncoupling operation, the first drive motor is driven, and thereafter, the coupling means is caused to perform the coupling operation.

6. The spindle device according to claim 1, further comprising a second drive motor for rotating the spindle about the axis, wherein
the second drive motor is configured by a second rotor arranged on the outer circumferential surface of the spindle in a manner to be kept apart by an interval in an axis direction of the spindle from a disposing position of the first rotor, and being smaller in mass than the first rotor and a second stator fixedly provided on the inner circumferential surface of the support hole of the housing in a manner to be kept apart by an interval in a radially outward direction from an outer circumferential surface of the second rotor, and
the controlling means is further configured to control an operation of the second drive motor.

7. The spindle device according to claim 6, wherein
the controlling means is configured to rotate the spindle about the axis by switching between when at least the first drive motor is driven in a state where the coupling means is caused to perform the coupling operation and when the second drive motor only is driven in a state where the coupling means is caused to perform the uncoupling operation.

8. The spindle device according to claim 6, wherein the controlling means is configured to cause the coupling means to perform the uncoupling operation, and thereafter, to control the second drive motor to stop a rotation of the spindle.

9. The spindle device according to claim 6, wherein the controlling means is configured to individually control the first drive motor and the second drive motor in a state where the coupling means is caused to perform the uncoupling operation such that rotational speeds of the first rotor and that of the second rotor reach previously set rotational speeds, respectively, and thereafter, to cause the coupling means to perform the coupling operation.

* * * * *